Patented Sept. 6, 1949

2,481,406

UNITED STATES PATENT OFFICE 2,481,406

EPHEDRINE-ETHYLENE DIAMINE COMPLEX

Edgar A. Ferguson, Jr., Brooklyn, N. Y.

No Drawing. Application August 2, 1946,
Serial No. 687,962

1 Claim. (Cl. 167—65)

This invention relates to a new and improved therapeutic agent, and more particularly to a new ephedrine complex useful in therapy where ephedrine administration has heretofore been indicated.

Ephedrine, as well as its salts, are well known to medical science. Its classical use has been as a bronchodialator and for the purpose of relieving spasm in all smooth muscle systems. It has also been used as a local vasoconstrictor in nasal congestion.

It has now been found, in accordance with the present invention, that a new ephedrine complex may be prepared and employed in all cases where ephedrine heretofore has been indicated. This ephedrine complex is formed by reacting ephedrine or its salts with ethylene diamine or its salts. It has been found, furthermore, that the reaction product of ephedrine and ethylene diamine is of relatively low toxicity and affords enhanced ephedrine action, making it possible to obtain greater clinical benefit than may be obtained with ephedrine alone.

The precise chemical formula for the new ephedrine-ethylene diamine complex is not known. It should be pointed out, however, that the expression "ephedrine-ethylene diamine complex," as used herein, is intended to cover the reaction product or products of these two materials regardless of the precise chemical nature of the product or products. It will be understood, furthermore, that when the term "reaction product" is used, this is to connote the material resulting from the reaction of ephedrine and ethylene diamine, or their salts, regardless of whether the end product may constitute one or more newly formed chemical compounds or may contain unreacted ephedrine and/or ethylene diamine, or salts of either. As a matter of fact, it is believed that the complex of the invention is made up of several compounds which are "loose combinations" of ephedrine and ethylene diamine.

When the two components, ephedrine and ethylene diamine, are reacted one with the other, the following general reaction is believed to take place, although, having the foregoing explanation in mind, the invention is in no way limited in this respect:

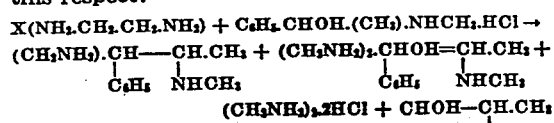

In the foregoing reaction the "X" stands for an integer.

In this reaction, ethylene diamine may be used or any of its salts such as the hydrochloride or the hydrobromide. The use of ethylene diamine hydrate is also within the purview of the invention. With respect to ephedrine, this compound may be used per se either in the dextorotatory form, the laevoratatory form, or in a dl mixture, or it may also be employed in the form of its salts, such as the hydrochloride, sulphate or acetate. Mixtures of any of the foregoing are likewise contemplated.

The ephedrine and the ethylene diamine may be reacted in aqueous media, although other mutual solvents may be used. It is not necessary, of course, to employ mutual solvents if solutions of the two reactants are agitated. Ephedrine is soluble in water 1:5, in alcohol 1:500, and in ether or chloroform. Eethylene diamine is soluble in water as well as in alcohol and 1:3 ether.

The reaction is preferably carried out in an alkaline medium such as 0.1 gram $NaHCO_3$ in 100 gr. of water. Other alkaline reagents may be employed so long as they are not poisonous and do not react unfavorably with the ingredients. $Na_2CO_3$ or $NaOH$ are examples of other alkaline reagents. While it is not necessary to carry out the reaction in an alkaline media, it is desirable, because the formation of the loose complex, ephedrine-ethylene diamine, is hastened. The reaction product is recovered as a crystalline solid.

As indicated, the ephedrine-ethylene diamine complex may be used per se in all instances where ephedrine itself is indicated. However, it is also within the contemplation of the present invention to employ the complex with carriers which in themselves may or may not possess therapeutic properties.

For instance, the ephedrine-ethylene diamine complex may be compounded with analgesics and caffeine citrates to serve as a relaxant for smooth muscle in spastic gastric distress, asthma or dysmenorrhea. The following is a formula for an anti-spasmodic analgesic tablet:

| | Milligrams |
|---|---|
| Ephedrine-ethylene diamine complex (containing 30% ethylene diamine) | 10.6 |
| Caffeine citrate | 62.5 |
| Acetylsalicylic acid | 143.74 |

In the foregoing reaction the "X" stands for an integer.

The foregoing formula may be modified by deletion of the caffeine citrate or the acetylsalicylic acid or by the substitution of either.

Another formula for an anti-spasmodic specifically for use in asthma treatment is as follows:

|  | Milligrams |
|---|---|
| Ephedrine-ethylene diamine complex (containing 30% ethylene diamine) | 12 |
| Theophylline | 100 |
| Ammonium bromide | 300 |

The ephedrine-ethylene diamine complex of the invention may also be incorporated in nose drops as a local vasoconstrictor specifically for use in nasal pharyngeal and sinus congestion:

| Ephedrine-ethylene diamine complex (containing 30% ethylene diamine) _gram_ | 1 |
|---|---|
| Isotonic salt solution _cc_ | 99 |

The foregoing formula may be modified by the introduction of a compatible antiseptic or a bacteriostatic, such as a soluble sulfa drug or salt, by incorporation of a buffer to adjust or affix the pH or by a combination of both.

In another nose drops formula, 4.24 grams of ephedrine-ethylene diamine dihydrobromide, prepared by reacting 1.04 grams of ethylene diamine dihydrobromide with 3.2 grams of ephedrine hydrochloride in 10 grams of water, are dissolved in 357.6 grams of water to give a 1.16% solution with a pH of 3.7. The solution is then made isotonic by adding mannitol.

Isotonicity was measured by means of a R. B. C. fragility test which showed that R. B. C.'s were preserved within a wide range of percentages, namely, from 2–10%. Microscopic determination of crenation of R. B. C.'s showed 19 per field at 2.6%, 1 per field at 3.6%, and 12 per field at 5%. This indicates isotonicity at a point of the order of 4%.

What is claimed is:

A therapeutic agent useful as a smooth muscle relaxant and local vasoconstrictor comprising the reaction product of ethylene diamine and ephedrine.

EDGAR A. FERGUSON, Jr.

REFERENCES CITED

The following references are of record in the file of this patent:

UNITED STATES PATENTS

| Number | Name | Date |
|---|---|---|
| 919,161 | Gruter | Apr. 20, 1909 |
| 2,006,114 | Rosenmund | June 25, 1935 |
| 2,128,851 | Rimbock | Aug. 30, 1938 |
| 2,130,322 | Kharasch | Sept. 13, 1938 |

OTHER REFERENCES

Robinson et al., J. A. P. A. vol. 1 #11, Nov. 1940, pages 410–412.

Sollman, A Manual of Pharmacology 6th ed. W. B. Saunders Co. Phila. 1942, page 482.

Deltamin, J. A. P. A. Aug. 1944, page 249. Prac. Pharm. ed.

Gutman, Modern Drug Encyclopedia and Therapeutic Guide, 2nd ed. 1941, pages 139, 914, 915.

Certificate of Correction

Patent No. 2,481,406　　　　　　　　　　　　　　　　　　September 6, 1949

EDGAR A. FERGUSON, Jr.

It is hereby certified that error appears in the printed specification of the above numbered patent requiring correction as follows:

Column 2, lines 54 and 55, strike out the words and period 'In the foregoing reaction the "X" stands for an integer.';

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*